Figure 1:
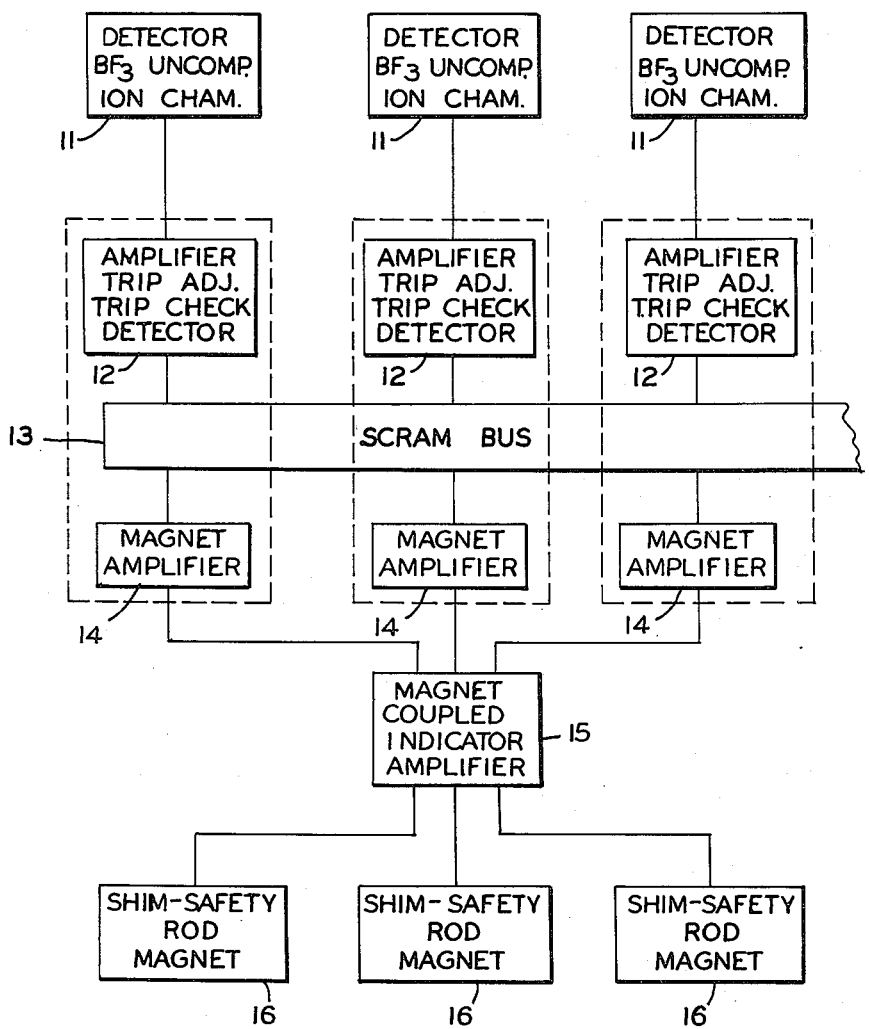

Dec. 24, 1963  R. B. STANFIELD  3,115,609
SIGNAL RESPONSIVE APPARATUS
Filed June 3, 1960  2 Sheets-Sheet 2

INVENTOR.
ROBERT B. STANFIELD
BY
Charles Hieken
ATTORNEYS 3,115,609
SIGNAL RESPONSIVE APPARATUS
Robert B. Stanfield, 426 Marlborough St.,
Boston, Mass.
Filed June 3, 1960, Ser. No. 33,733
4 Claims. (Cl. 328—148)

The present invention relates in general to signal responsive apparatus and more particularly concerns a novel safety amplifier for use with a nuclear reactor to rapidly shut down the reactor upon sensing an unsafe condition inside the reactor. This invention is characterized by numerous fail-safe features incorporated into a system which itself includes reliable components not easily subject to failure.

A typical nuclear reactor generates heat resulting from chain reactions as matter is converted into energy. However, it is important that the rate of such reactions do not exceed a predetermined safe value. This rate is proportional to the neutron flux level. If the flux level exceeds a predetermined safe limit, the reaction may be attenuated by dropping cadmium rods into the reactor, or by other suitable techniques. The use of cadmium rods is advantageous because they may be held by energized electromagnets in a normal position which does not interfere with the nuclear reaction. When an unsafe condition develops, the electromagnet is deenergized, releasing the cadmium rod to inhibit the reaction.

In a typical installation, a $BF_3$ detector responds to the flux level within the reactor by generating a D.-C. current proportional to the radiation level. If this D.-C. current exceeds a predetermined value, suitable means release the cadmium safety rod.

Most prior art devices utilize some form of D.-C. coupled amplification to maintain the holding magnet normally energized. In such devices, the trip point has a tendency to drift, the circuits are not always fail-safe, they lack reliability, the response to an alarm condition is relatively slow, and they sometimes subject the electromagnet winding to an excessive transient voltage due to a sudden changing current, thereby damaging the magnet as an arc jumps between adjacent turns of the winding.

Unreliability of such safety devices can be costly in terms of both money and time. If an alarm condition is indicated when a dangerous condition is actually not present in the reactor, the reaction is still terminated and after the fault in the safety sensing system is located, it is necessary to again follow the long procedure for reestablishing the reaction. Of course, during the period of shut down, energy is not being generated.

Accordingly, it is an important object of the present invention to provide a nuclear reactor safety system capable of exceptionally reliable operation so that an alarm condition is indicated only when the unsafe condition is actually sensed.

It is another object of the invention to provide a safety system in accordance with the preceding object which is virtually fail-safe so that if the safety system itself fails, such failure will be indicated by an alarm condition signal.

Still another object of the invention is to provide a fail-safe condition sensing system which is relatively compact and low in cost despite its great reliability and sensitivity to the condition being monitored.

Still a further object of the invention is to provide a system in accordance with the preceding object which reacts almost instantaneously to sensing a dangerous condition by rapidly taking action to remove the danger.

According to the invention, a monitored D.-C. signal is combined with a D.-C. reference signal to provide a combined D.-C. signal which is normally periodically interrupted to provide an A.-C. signal, the presence and absence of the A.-C. signal being indicative of the normal and abnormal conditions, respectively. Sensing means responsive to a predetermined relationship between the reference and monitored signals disables the switching means to terminate the A.-C. signal and thereby cause the indicating means to indicate an abnormal condition.

More specifically, the D.-C. signals are currents. The combination of these currents is periodically interrupted by a transistor rendered alternately conductive and nonconductive by a switching signal source to provide an A.-C. signal. The A.-C. signal is amplified, rectified and filtered to provide a D.-C. control signal. When the reference current exceeds the monitored current, the A.-C. signal is interrupted to remove the control signal and signify the alarm. Interruption of the control signal is rapid because the rectifying and filtering circuit time constants need only be long enough to average several cycles of the A.-C. signal; that is, the important time constants need only be about ten times the period of the switching signal.

The holding magnet current source preferably comprises a power electron tube whose cathode is in series with a voltage reference device, such as a VR tube and the magnet field coil. The rectified and filtered A.-C. signal comprises the control signal which is applied to the power tube to maintain it normally conductive.

Figure 2:
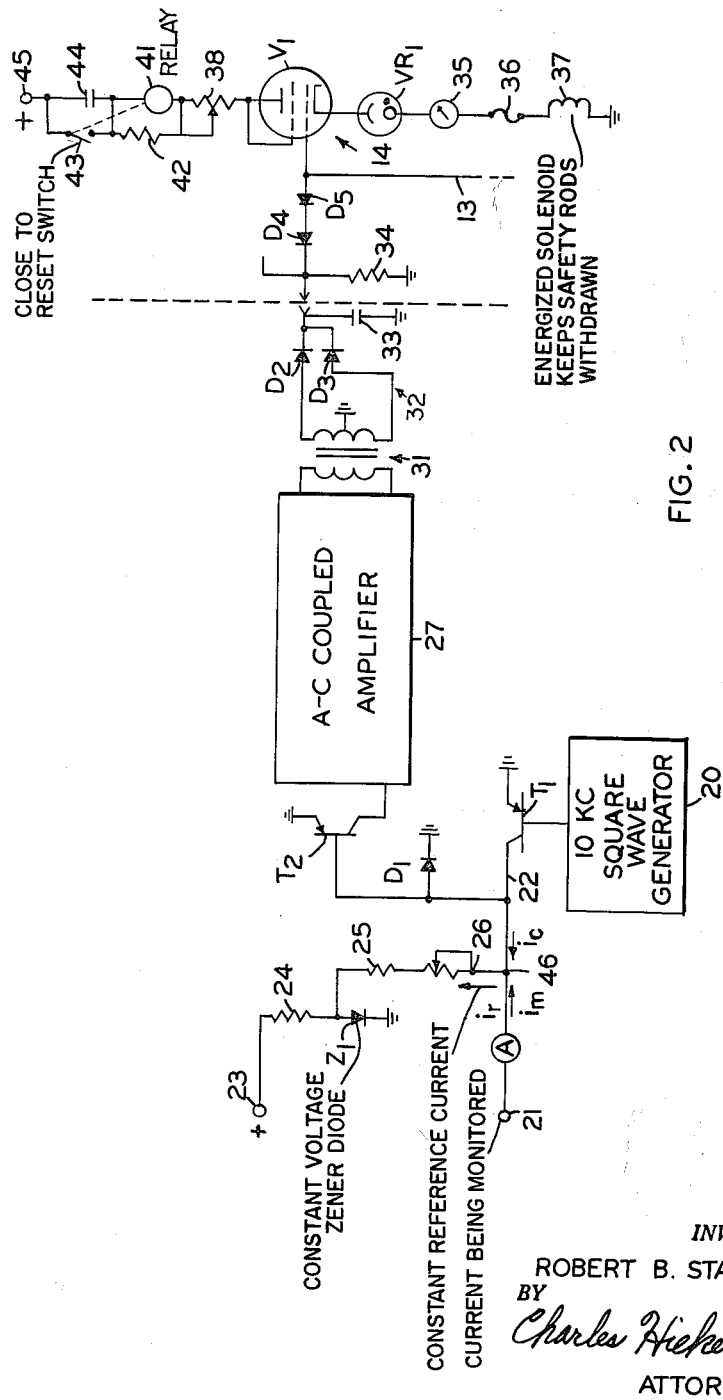

Numerous other features, objects and advantages of the invention will become apparent from the following specification when read in connection with the accompanying drawing in which:

FIG. 1 is a block diagram generally illustrating the logical arrangement of a nuclear reactor safety system; and, FIG. 2 is a schematic circuit diagram of a preferred embodiment of a safety amplifier according to the invention.

With reference now to the drawing and more particularly FIG. 1 thereof, there is shown a block diagram generally illustrating the logical arrangement of nuclear reactor safety channels. For safety reasons, there are a plurality of parallel channels. Each channel includes an uncompensated $BF_3$ detector situated in the reactor chamber and providing a current indicative of the neutron flux level therein. An uncompensated detector is suitable for this safety system.

The detector current is delivered to a fully transistorized circuit 12 including amplifiers, the trip adjustment, and the trip check detector to provide a control signal which is applied to the scram bus 13 so that if any of the circuits 12 indicates an alarm condition, a characteristic signal is applied to the scram bus 13 to disable all the magnet amplifiers 14, causing the shim safety rod magnets 16 to release a rod of cadmium which inhibits the reaction. Release of each rod is sensed and indicated by the magnet coupled indicator amplifier 15. The indicator amplifier 15 may include an inductance sensitive bridge circuit which responds to a change in magnet inductance resulting from the release of a rod.

Referring to FIG. 2, there is shown a schematic circuit diagram of the magnet amplifier 14 and the transistorized alarm circuits 12. The monitored current is applied at terminal 21 and is combined with a reference current at the collector lead 22 of transistor T1. This reference current is delivered from a source of negative potential applied to terminal 23 through a relatively small resistor 24 and a much larger series resistance of resistor 25 in series with potentiometer 26, the latter resistors being shunted by a Zener diode Z1 to establish a constant potential across these resistors and thereby establish a nearly constant reference current having a value determined by the setting of potentiometer 26.

The collector lead 22 is direct coupled to the base of normally conductive transistor T2, the signal on its collector being amplified by the A.-C. coupled amplifier 27. The output of A.-C. coupled amplifier 27 is coupled through a transformer 31 to a full-wave rectifying circuit 32 to develop a D.-C. potential across the low pass filter formed by capacitor 33 and resistor 34 proportional to the amplitude of the A.-C. signal. This signal is normally sufficiently positive to maintain the two series diodes D4 and D5 nonconductive so that the potential on scram bus 13 is normally sufficiently positive to enable electron tube V1 in the magnet amplifier 14 to conduct.

The cathode of electron tube V1 is in series with voltage regulator tube VR1, ammeter 35, fuse 36 and the solenoid coil 37 of the magnet. Its plate and screen grid are connected together for triode operation and receive current through potentiometer 38 in series with relay coil 41 and the scram reset switch 43 shunted by capacitor 45 connected to a source of positive potential on terminal 45. Relay 41 is shunted by a resistor 42.

Operation of the system is as follows. The current being monitored, $i_m$, is delivered to terminal 21 and combined with the reference current $i_r$ at node 46. The reference current $i_r$ is essentially constant since it is proportional to the relatively constant voltage developed across the Zener diode Z1 divided by the relatively high series resistance formed by resistor 25 and potentiometer 26, adjustment of the latter permitting control of the magnitude of the reference current. Under normal operating conditions, $i_m$ is less than the reference current $i_r$ so that the difference is equal to the collector current flowing from collector 22, $i_c$, in the direction shown in order to satisfy Kirchoff's law.

The switching signal applied from the 10 kc. square wave generator 20 to the base of transistor T1 periodically interrupts the signal on collector 22 so that an A.-C signal is applied to the base of transistor T2. The amplified A.-C. signal on the collector of transistor T2 is further amplified by the A.-C. coupled amplifier 27. This amplified signal is then coupled by transformer 31 and rectified to provide a positive potential on capacitor 33 which normally maintains diodes D4 and D5 nearly nonconductive. While it is very unlikely that these diodes will fail in the reverse direction unsafely, the consequences of such failure may be further reduced by connecting another pair of similarly poled series diodes across diodes D4 and D5.

Should the current being monitored, $i_m$, equal or exceed the reference current $i_r$, the direction of the current $i_c$ reverses and flows through clamping diode D1 so that the collector is no longer able to provide an A.-C. signal. The A.-C. signal no longer appears on the collector lead 22 and transistor T2 is further rendered nonconductive by the clamping action of diode D1. Immediately upon the cessation of the A.-C. signal, capacitor 33 begins to discharge through resistor 34 and since this discharge time constant is only above five times greater than a period at 10 kc., the potential across capacitor 33 drops rapidly and diodes D4 and D5 conduct to clamp the grid of tube V1 to the lowering potential and cut this tube off. When electron tube V1 is cut off, the magnet coil 37 is deenergized and the bar is dropped into the nuclear reactor to inhibit the reaction.

It immediately becomes evident that any circuit ahead of the resistor 34 which fails and causes the A.-C. signal to crease will cause the indication of an alarm condition. In addition, there are also a number of safety features in the circuits which follow. For example, if the tubes draw too much current, the fuse 36 melts and the current of the magnet is again cut off. If the VR tube fails open, current is removed from the magnet coil 37. The scram reset switch 43 is normally held in place by the energized relay coil 41 so that a manual reset is provided to again establish the monitoring condition. Thus, the safety apparatus does not allow the reaction to begin again until necessary safety steps have been taken.

There has been described a novel monitoring system incorporating numerous fail-safe features, which is itself unlikely to fail, to insure reliable monitoring. While the invention has been described with respect to an extremely important function of monitoring a nuclear reactor, the principles of the invention are applicable to many other situations where an indication of a change in a monitored condition is desired. Numerous other uses and modifications of and departures from the specific system described herein may be practiced by those skilled in the art without departing from the inventive concepts. Consequently, the invention is to be construed as limited only by the spirit and scope of the appended claims.

What is claimed is:

1. Signal responsive apparatus comprising, a source of a D.-C. reference current, a source of a monitored D.-C. current, means for combining said monitored and said reference currents, a switching transistor, a source of an A.-C. switching signal, means for applying said switching signal to said switching transistor to periodically interrupt said combined currents and provide a data A.-C. signal from said switching transistor, means responsive to the presence and absence of said data A.-C. signal for indicating normal and abnormal conditions respectively, means for establishing said switching transistor responsive to a predetermined relationship between said reference and monitored signals for interrupting the delivery of said data A.-C. signal and thereby causing said sensing means to indicate an abnormal condition.

2. Signal responsive apparatus in accordance with claim 1 wherein said data signal responsive means comprises, a rectifying circuit, and a low pass filter energized by said rectifying circuit.

3. Signal responsive apparatus in accordance with claim 2 and further comprising, a source of controllable current having a control electrode, means for coupling the output of said rectifying circuit to said control electrode to maintain the latter source conductive and nonconductive in response to said normal and abnormal conditions respectively.

4. Signal responsive apparatus in accordance with claim 3 and further comprising, a voltage reference device in series with said controllable source for developing a reference potential, said means coupling the low pass filter output to said control electrode comprising a unilaterally conductive device poled for conduction when the output potential of said low pass filter is less than that on said control electrode, said control electrode potential being normally related to said reference potential.

References Cited in the file of this patent

UNITED STATES PATENTS

| 2,801,338 | Keller | July 30, 1957 |
| 2,964,649 | Vance | Dec. 13, 1960 |

OTHER REFERENCES

"Sensitive Limit Detector," Porter, Electronics magazine, October 1955, pp. 202, 204, 206, and 208.

"How Transistor Circuits Protect Atomic Reactors," Wade et al., Electronics, Engineering edition, July 18, 1958, pp. 73–75.